United States Patent

Feustle

(10) Patent No.: US 9,151,291 B2
(45) Date of Patent: Oct. 6, 2015

(54) ROTARY ENGINE

(76) Inventor: Gerhard Feustle, Diessen am Ammersee (DE)

( * ) Notice: Subject to any disclaimer, the term of this patent is extended or adjusted under 35 U.S.C. 154(b) by 270 days.

(21) Appl. No.: 13/546,567

(22) Filed: Jul. 11, 2012

(65) Prior Publication Data

US 2013/0183184 A1    Jul. 18, 2013

Related U.S. Application Data

(63) Continuation of application No. PCT/EP2011/050544, filed on Jan. 17, 2011.

(60) Provisional application No. 61/295,862, filed on Jan. 18, 2010.

(30) Foreign Application Priority Data

Jan. 18, 2010 (DE) .......................... 10 2010 000 976

(51) Int. Cl.
*F02B 53/04* (2006.01)
*F04C 2/00* (2006.01)
(Continued)

(52) U.S. Cl.
CPC ... *F04C 2/00* (2013.01); *F01C 1/28* (2013.01); *F01C 1/44* (2013.01); *Y02E 10/46* (2013.01)

(58) Field of Classification Search
CPC .............. F01C 1/28; F01C 1/344; F01C 1/44; F01C 21/006; F01C 21/08; F01C 21/0809; F01C 21/10; F01C 21/18; F02B 53/00; F02B 53/04; F02B 53/06; F04C 2/00; F04C 2/344; Y02E 10/46

USPC .......... 123/200, 221, 222, 239; 418/191, 237, 418/266

See application file for complete search history.

(56) References Cited

U.S. PATENT DOCUMENTS 126,355 A * 4/1872 Ward .............................. 418/124
1,002,059 A * 8/1911 Heyen ........................... 418/266
(Continued)

FOREIGN PATENT DOCUMENTS

DE    24 60 949 A1    7/1975
EP    1 405 996 A1    4/2004
(Continued)

OTHER PUBLICATIONS

Official Communication issued in International Patent Application No. PCT/EP2011/050544, mailed on May 29, 2012.
(Continued)

*Primary Examiner* — Thai Ba Trieu
*Assistant Examiner* — Jason T Newton
(74) *Attorney, Agent, or Firm* — Keating & Bennett, LLP

(57) ABSTRACT

A rotary engine includes a housing body having a first rotation chamber and a second rotation chamber. A first rotary body is arranged within the first rotation chamber, and a second rotary body is arranged within the second rotation chamber. A boundary surface of the first rotation chamber has a variable distance from an opposite surface of the first rotary body. A pair of valve flaps having a first valve flap and a second valve flap is arranged on the first rotary body. Upon rotation of the first rotary body, the valve flaps are in engagement with the boundary surface of the first rotation chamber and are rotated in mutually opposite directions with regard to the first rotary body so as to form two mutually demarcated working chambers within the first rotation chamber.

20 Claims, 11 Drawing Sheets

(51) Int. Cl.
*F01C 1/28* (2006.01)
*F01C 1/44* (2006.01)

(56) References Cited

U.S. PATENT DOCUMENTS

| | | | | |
|---|---|---|---|---|
| 1,023,993 | A | | 4/1912 | Charles |
| 1,559,654 | A | * | 11/1925 | Lawrence et al. ............. 418/129 |
| 2,124,542 | A | * | 7/1938 | Chisholm ..................... 123/222 |
| 2,402,257 | A | * | 6/1946 | Rich ............................. 123/230 |
| 2,403,684 | A | * | 7/1946 | Rich ............................. 123/230 |
| 2,585,354 | A | * | 2/1952 | Thorgrimsson ............... 418/175 |
| 2,812,748 | A | * | 11/1957 | Simonian ..................... 123/239 |
| 3,397,618 | A | * | 8/1968 | Jensen .......................... 418/266 |
| 3,601,512 | A | * | 8/1971 | Kehl ................................ 418/77 |
| 3,824,968 | A | * | 7/1974 | Brumagim .................... 123/243 |
| 3,833,321 | A | * | 9/1974 | Telang et al. ................. 418/178 |
| 3,884,196 | A | * | 5/1975 | Grob et al. ................... 123/235 |
| 4,106,472 | A | * | 8/1978 | Rusk ............................. 123/205 |
| 4,286,555 | A | * | 9/1981 | Williams ...................... 123/228 |
| 4,515,123 | A | | 5/1985 | Taylor |
| 5,188,524 | A | * | 2/1993 | Bassine ......................... 418/152 |
| 5,704,332 | A | * | 1/1998 | Motakef ....................... 123/225 |
| 6,371,745 | B1 | * | 4/2002 | Bassine ......................... 418/268 |
| 6,749,405 | B2 | * | 6/2004 | Bassine ......................... 417/313 |
| 7,114,932 | B1 | * | 10/2006 | Bassine ......................... 418/268 |
| 2002/0014218 | A1 | * | 2/2002 | Beal .............................. 123/249 |
| 2004/0168670 | A1 | | 9/2004 | Stanishevskaya |
| 2012/0227703 | A1 | * | 9/2012 | Gaither ......................... 123/210 |

FOREIGN PATENT DOCUMENTS

| | | | |
|---|---|---|---|
| FR | 569615 | A | 4/1924 |
| FR | 1302333 | A | 8/1962 |
| GB | 677674 | A | 8/1952 |
| JP | 50-112610 | A | 9/1975 |
| JP | 2004-530828 | A | 10/2004 |
| WO | 96/41934 | A1 | 12/1996 |
| WO | WO 2009153143 | A1 * | 12/2009 ............. F25B 27/00 |

OTHER PUBLICATIONS

Official Communication issued in corresponding German Patent Application No. 10 2010 000 976.8, mailed on Oct. 11, 2012.
Official Communication issued in corresponding Japanese Patent Application No. 2012-548456, mailed on Aug. 6, 2013.

* cited by examiner

ROTARY ENGINE

CROSS-REFERENCE TO RELATED APPLICATIONS

This application is a continuation of copending International Application No. PCT/EP2011/050544, filed Jan. 17, 2011, which is incorporated herein by reference in its entirety, and additionally claims priority from German Application No. 102010000976.8-15, filed Jan. 18, 2010, and U.S. application Ser. No. 61/295,862, filed Jan. 18, 2010, both of which are incorporated herein by reference in their entirety.

The present invention relates to a rotary engine that may be used, for example, as a heat engine or for producing energy from regenerative sources of energy.

BACKGROUND OF THE INVENTION

EP 1 405 996 A1 describes a rotary engine on the basis of a thermodynamic process. The rotary engine is shown in FIG. 9, the advantages are referred to by the inventors as increased fuel efficiency and simple manufacture of the rotary engine as compared to thermodynamic machines known to date. In the rotary engine shown, two rotary bodies counter rotate, a first rotary body being arranged within the working chamber, and a secondary rotary body being arranged within the compression chamber. A working medium is fed into the compression chamber by the rotary body located within the working chamber, where it is ignited separately from the working chamber and is fed back to the working chamber, where it carries out work by expanding and thus driving the rotary body located within the working chamber. A disadvantage of the machine described in said document is that slides are inserted into both rotary bodies for seals of the working chamber and compression chamber, which slides are pressed outward upon rotation of the rotary bodies, due to the arising centrifugal forces, against an inner housing wall of the housing 1 of the rotary engine so as to thereby be able to compress the medium. However, said slides are subject to a large amount of wear and tear, and the contact pressure of the slides to the inner housing wall and, thus, the tightness are based only on the arising centrifugal force upon rotation of the rotary bodies, or on springs arranged between the slide elements and the rotary body. Over time, said springs may lose their tensional force, which may result in a leak in the working chamber and the compression chamber. What is also disadvantageous is that the two rotary bodies move in opposite directions while being in constant contact, which leads to increased friction of the rotary bodies: this results either in a large amount of wear and tear or in utilization of costly, low-wear materials on surfaces of the rotary bodies.

SUMMARY

According to an embodiment, a rotary engine may have: a housing body having a first rotation chamber and an energy absorption chamber; a first rotary body located within the first rotation chamber; the housing body being configured such that a boundary surface of the first rotation chamber has a distance, from an opposite surface of the first rotary body, that is variable with regard to the circumference of the first rotary body; a second rotary body located within the energy absorption chamber; and a pair of valve flaps having a first valve flap and a second valve flap, the valve flaps being rotatably arranged on the first rotary body such that upon rotation of the first rotary body, the valve flaps are in engagement with the boundary surface of the first rotation chamber and are rotated in mutually opposite directions with regard to the first rotary body so as to form two mutually demarcated working chambers within the first rotation chamber, the first rotation chamber being connected to the energy absorption chamber such that upon rotation of the first rotary body, a working gas compressed by a valve flap blade is transferred from a working chamber of the first rotary body into a cavity of the second rotary body located within the energy absorption chamber and becomes trapped between a surface of the cavity and a boundary surface of the energy absorption chamber; and the rotary engine being configured to supply energy to the working gas trapped within the cavity of the second rotary body so as to increase a pressure of the working gas contained within the cavity.

The core idea of the present invention is based on that a rotary engine comprising a first rotary body located within a first rotary chamber and a second rotary body located within a second rotary chamber may have increased tightness when a pair of valve flaps comprising a first valve flap and a second valve flap is arranged on the first rotary body, so that upon rotation of the first rotary body the valve flaps are engaged with a boundary surface of the first rotary chamber and are rotated in mutually opposite directions with regard to the first rotary body. The valve flaps are arranged such that upon rotation of the first rotary body, they form two mutually demarcated working chambers within the first rotary chamber. During movement of the first rotary body, the valve flaps are thus pressed against the inner wall of the housing body due to the centrifugal force, and due to an, e.g., crescent shape upon compression and expansion of a medium in the working chamber, they are pressed against the inner housing wall even more strongly, which results in a further increase in tightness.

Thus, it is an advantage of the present invention that by using valve flaps for moving a medium contained within the working chamber of a rotary engine, improved tightness upon compression or expansion of the medium is achieved, which results in an increased efficiency factor of the engine.

In addition, the rotatable arrangement of the valve flap blades on the first rotary body enables continuous adaptation of the valve flaps to the distance between the first rotary body and the inner housing wall.

BRIEF DESCRIPTION OF THE DRAWINGS

Embodiments of the present invention will be detailed subsequently referring to the appended drawings, in which:

FIG. 2b shows a sectional view of the rotary engine shown in FIG. 2a;

FIG. 5b shows a sectional view of the rotary engine shown in FIG. 5a;

FIG. 6b shows a sectional view of an energy absorption chamber of the rotary engine shown in FIG. 6a;

DETAILED DESCRIPTION OF THE INVENTION

Figure 1:
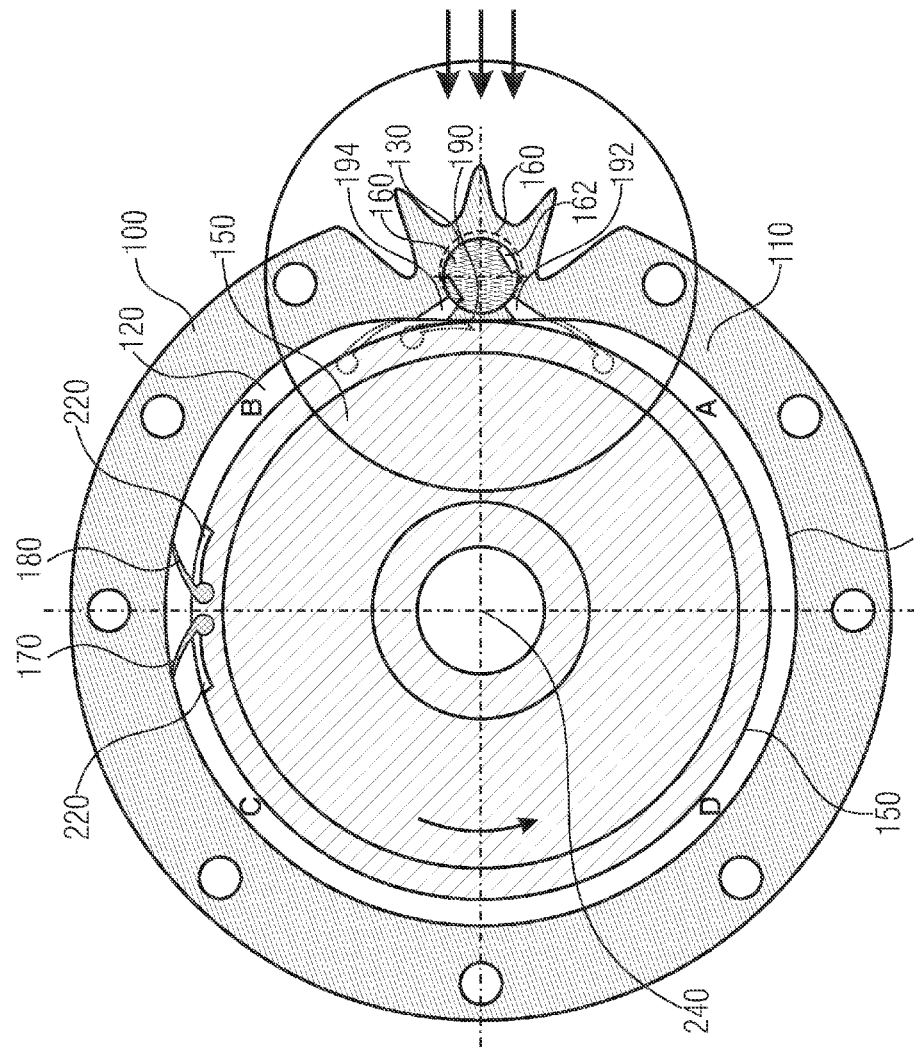
FIG. 1 shows a top view of a rotary engine in accordance with an embodiment of the present invention.

Before the present invention will be explained in more detail below with reference to the figures, it shall be pointed out that identical elements in the figures have been given identical or similar reference numerals and that repeated description of said elements will be dispensed with.

FIG. 1 shows a rotary engine 100 in accordance with an embodiment of the present invention. The rotary engine 100 shown in FIG. 1 comprises a housing body 110 having a first rotary chamber 120 and a second rotary chamber 130. A first rotary body 150 is arranged within the first rotary chamber 120. A second rotary body 160 is arranged within the second rotary chamber 130. The first rotary body 150 has a pair of valve flaps comprising a first valve flap 170 and a second valve flap 180 rotatably arranged therein. The openings of the first valve flap 170 and of the second valve flap 180 point in opposite directions. The distance from a boundary surface 122 of the first rotary chamber 120, that is, from an inner housing body wall to an opposite surface 152 of the first rotary body 150 varies such that a bottleneck 190 is formed between the surface 152 and the inner housing wall, or the boundary surface 122 of the first rotary chamber 120. The first rotary chamber 120 is connected to the second rotary chamber 130 for example via a first passage 192 and via a second passage 194, which are arranged at the bottleneck 190. The rotary body 160 located within the second rotary chamber 130 is sealingly connected to a boundary surface of the second rotary chamber 130. In addition, the rotary body 160 may comprise one or more cavities 162, for example. A medium 196, such as gas, for example, may be contained within the first rotary chamber 120 and within the second rotary chamber 130.

A valve flap will sometimes also be referred to as a valve flap blade or a valve blade in the following.

Both valve flaps 170, 180 together with the bottleneck 190 form two separate working chambers A, B within the first rotary chamber 120. By way of example, air is used as the medium 196, but any other gas mixture may also be used, of course. Due to rotation of the first rotary body 150, which may be produced, e.g., by compressed air or an electric starter, the first valve flap 170 and the second valve flap 180 are turned away from the first rotary body 150 so as to contact the inner housing wall of the housing body 110 and/or the boundary surface 122 of the first rotary chamber 120 in a fluid-tight manner. Upon rotation of the first rotary body 150, air contained within the working chamber A is thus compressed by the first valve flap 170. Due to the shape of the valve flap 170, compression of the air within the working chamber A increases the counter pressure exerted on the first valve flap 170, whereby the tightness of the first valve flap 170 with regard to the boundary surface 122 of the first rotary chamber 120 is increased further. The bottleneck 190 is configured such that it is either impermeable to air or is permeable to air only to a very small extent, so that the air compressed within the working chamber A is forced through the passage 192 and into the second rotary chamber 130 by the first valve flap 170. The second rotary body 160 located within the second rotary chamber 130 is advantageously coupled to the first rotary body 150, for example by means of a cog belt, so that rotation of the first rotary body 150 results in a rotation of the second rotary body 160 in the same direction, and so that the angular velocity of both rotary bodies is identical. Due to the fluid-tight connection of the second rotary body 160 to the inner housing wall of the second rotary chamber 130, the air compressed by the first valve flap blade 170 and coming from the working chamber A can only be transferred into the cavity 162 of the second rotary body 160. In order that the compressed air can be transferred into the cavity 162, the opening of the cavity 162 faces the passage 192 shortly before the first valve flap blade 170 passes the passage 192. While the first valve flap blade 170 passes the passage 192, the second rotary body 160 has already been rotated to such an extent that the compressed air contained within the cavity 162 is tightly entrapped between a surface of the cavity 162 and the boundary surface of the second rotary chamber 130; in other words, the air cannot flow back into the second rotary chamber 130 via the passage 192. The air that is entrapped within the cavity 162 and is heated due to the increase in the pressure and the reduction in the volume may now be further heated up by supplying energy such as thermal energy, for example; in other words, the entrapped air within the second rotary chamber 130 may have further energy supplied to it. Therefore, the second rotary chamber 130 is also referred to as an energy absorption chamber 130. An advantage of the rotary engine 100 shown here as compared to rotary engines that may possibly already be known is that at least or more than half a revolution of the second rotary body 160 is available for the absorption of energy within the energy absorption chamber 130 and/or within the second rotary chamber 130. To release heat to the air entrapped within the cavity 162, the second rotary chamber 130, or the energy absorption chamber 130, may have a heating. Due to the supply of heat at a constant volume of the entrapped air, the pressure of the entrapped air will also increase due to thermodynamic processes. Once the second valve flap blade 180 has passed the passage 194, the cavity 162 reaches the passage 194 due to the rotation of the second rotary body 160. The air entrapped within the cavity 162 under very high pressure may then escape abruptly and thus carries out work in that it sets the first rotary body 150 in motion by exerting pressure on the second valve flap blade 180. The second valve flap blade 180, which is arranged, in its direction, opposite the first valve flap blade 170, is subjected to increased pressure due to the highly pressurized escaping air, which presses it against the inner housing wall, or the boundary surface, 122 of the first rotary chamber 120 with increased force due to its shape, by analogy with the first valve flap 170, by means of which its tightness is even further increased. Expansion of the gas and carrying out of the work thus is effected within the working chamber B of the first rotary chamber 120. Due to the expansion of the air within the working chamber B, air is automatically compressed within the working chamber A, as a result of which the cyclic process starts again.

In addition to the increase in tightness and, thus, in the effectiveness and the efficiency factor of the rotary engine 100 as compared to rotary engines known to date, a direct mutually opposite contact of the rotary bodies 150, 160 may be avoided by arranging the second rotary body 160 within a second rotary chamber 130 separate from the first rotary chamber 120; as a result, the wear and tear caused by abrasion of the rotary bodies 150, 160 may be minimized many times over, and thus, an expensive abrasion-resistant coating of the rotary bodies 150, 160 may be dispensed with. In addition, the rotary bodies 150, 160 may be configured as cylindrical rotary bodies 150, 160, which—by contrast to an elliptical shape of the rotary bodies 150, 160, which would also be possible—leads to a cheaper manufacture and to rotation of the rotary bodies 150, 160 that is lower in vibrations due to lacking unbalances.

The rotary engine 100 shown in FIG. 1 thus involves less maintenance and is lower in cost than known rotary engines, and above all, due to utilization of opposite valve flaps 170, 180, its mode of action is more efficient than that of already known rotary engines.

In a further embodiment, the first rotary body 150 may further comprise valve flap cavities 250 for positive inclusion of the valve flaps 170, 180, said valve flaps forming a positive surface with the surface of the first rotary body 150 when they are folded and turned inward and toward the first rotary body 150.

Even though the second rotary body 160 shown in the rotary engine 100 has a cavity 162, it is also possible, in further embodiments, for a rotary body 160 to comprise a plurality of cavities 162, which are distributed on the second rotary body 160 independently of one another.

Even though in the embodiment shown in FIG. 1, only one pair of valve flaps is arranged with a first valve flap 170 and with a second valve flap 180 on the first rotary body 150, in further embodiments of the present invention, a plurality of pairs of valve flaps might be arranged on the first rotary body 150. In combination with a plurality of cavities 162 arranged on the second rotary body 160, the thermodynamic cyclic process might thus be performed several times during revolution of the two rotary bodies 150 and 160.

Even though the rotary engine 100 shown in FIG. 1 comprises only one second rotary chamber 130 which has a second rotary body 160 located therein, further embodiments may also be used which comprise further second rotary chambers 130 having rotary bodies 160 located therein.

It shall also be mentioned that the second rotary body 160 is advantageously produced from a material having poor thermal conduction; ceramics may be used in this context, for example.

In embodiments of the present invention, the distance of the two valve flaps 170, 180 of the pair of valve flaps should be as small as possible (for example smaller than 30° or smaller than 10° or even smaller than 2°) with regard to the circumference of the first rotary body 150. In addition, it is advantageous for the connection of the cavity 162 of the second rotary body 160 to the first passage 192 to be terminated when the first valve flap blade 170 passes the passage 192 so as to achieve as high compaction as possible. Accordingly, it is also advantageous for the cavity 162 to be connected to the passage 194 directly after the second valve flap blade 180 has passed the second passage 194, in order to enable as large a path of expansion as possible.

In further embodiments of the invention, the first rotary body and/or the second rotary body may be configured as cylindrical rotary bodies, which leads to simplified manufacture of the rotary bodies and, thus, to lower manufacturing cost for the entire rotary engine.

Advantageously, the first valve flap 170 and the second valve flap 180 may have a highly wear-resistant coating (for example of titanium), which enables a long life cycle of the valve flaps and low maintenance expenditure. Generally, a lubricant-free application is envisaged.

In order to further increase the contact pressure of the valve flaps 170, 180 toward the boundary surface 122 of the first rotary chamber 120, the valve flaps 170, 180 may be configured in a crescent shape, for example, whereby their contact pressure against the boundary surface 122 increases even further while pressure is exerted on the valve flaps 170, 180, and thus, an even higher level of tightness results.

Even though in the rotary engine 100 shown in FIG. 1, the housing body 110 is produced from one part, for example, a cast part, in a further embodiment the housing body 110 might also have several partial housings, for example two, which are interconnected in a fluid-tight manner with regard to the medium 196 contained within the rotary chambers.

In addition, the rotary engine 100 shown in FIG. 1 may have a starter device which enables setting in motion the first rotary body 150 and, connected thereto, the second rotary body 160. The starter device may be based on the principle of an electric starter having a connected battery, similar to a starter device for an internal combustion engine, for example in a motor vehicle.

However, it is also possible for the rotary engine 100 to have an external compressed-air storage, from which, for starting the engine, compressed air is directed into the first rotary chamber 120, by which means the engine is started. The highly compressed air within the compressed-air storage may have been forced into the compressed-air storage by the rotary engine 100, for example via a preceding work process of the rotary engine 100.

Embodiments of the present invention may further comprise, on the valve flaps 170, 180, springs which bias the valve flaps 170, 180, so that the valve flaps 170, 180 become engaged with the boundary surface 122 of the first rotary chamber 120 as early as at the standstill of the first rotary body 150.

In accordance with further embodiments, the valve blades 170 and 180 with the rotary body 150 may have the same length in the axial direction of a rotational axis 240 of the rotary body 150.

In accordance with further embodiments, the valve flap blades 170, 180 may be inserted into the rotary body 150 by means of valve flap cavities 220 such that on the one hand, they can pass the bottleneck 190 of the rotary body 150 and of the inner cylinder shape, i.e. of the boundary surface 122 of the working chamber 120 without any resistance in a positive manner with the exterior rotor contour, and that on the other hand, they are pivoted in the rotor circumference, so that the free end of a flap blade 170, 180 skim over the inner shape 122 of the cylinder tube jacket 110 by means of centrifugal force, or with support of spring force.

Figure 2A:
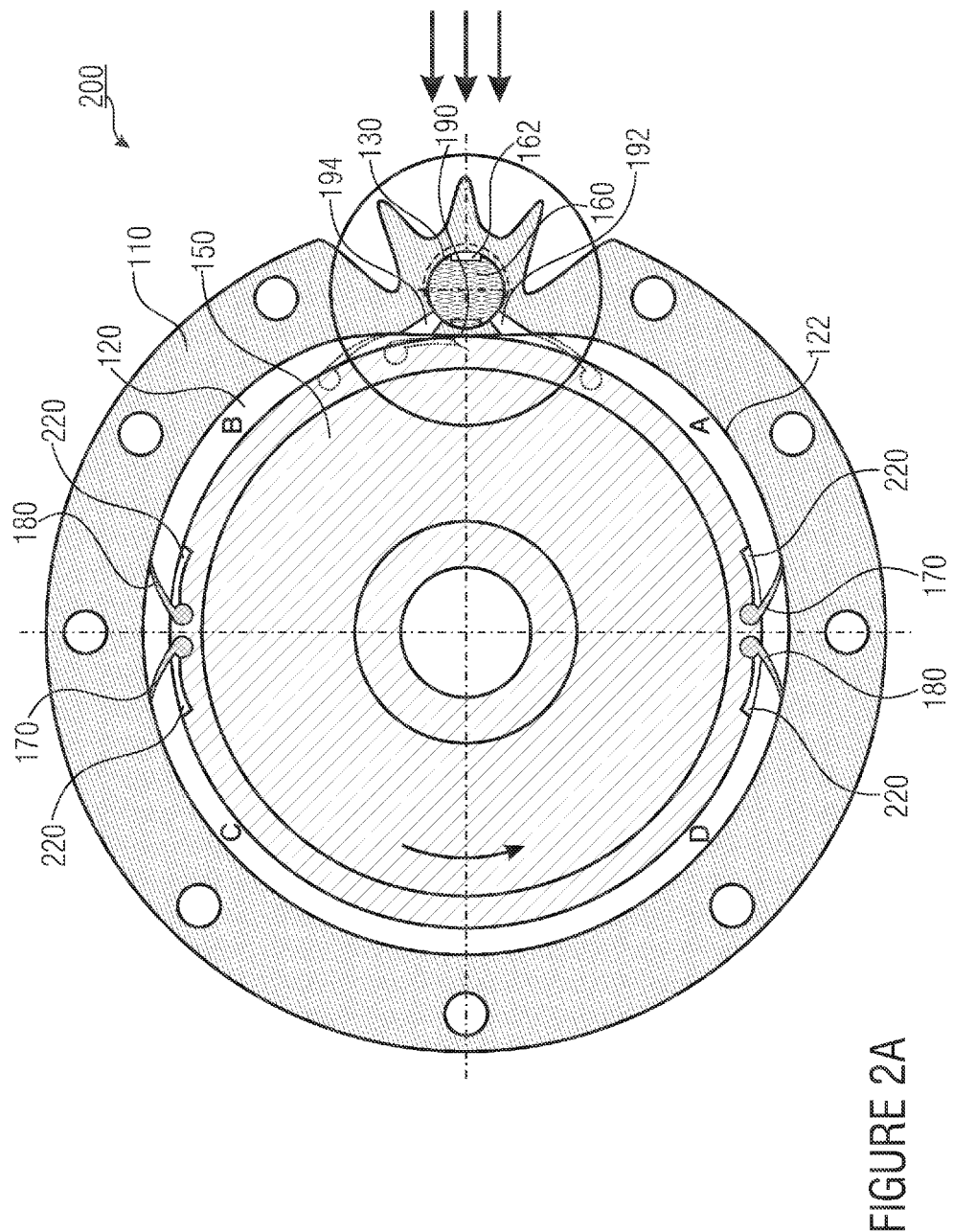
FIG. 2a shows a top view of a rotary engine in accordance with an embodiment of the present invention.

FIG. 2a shows a top view of a rotary engine 200 in accordance with an embodiment of the present invention.

Figure 2B:
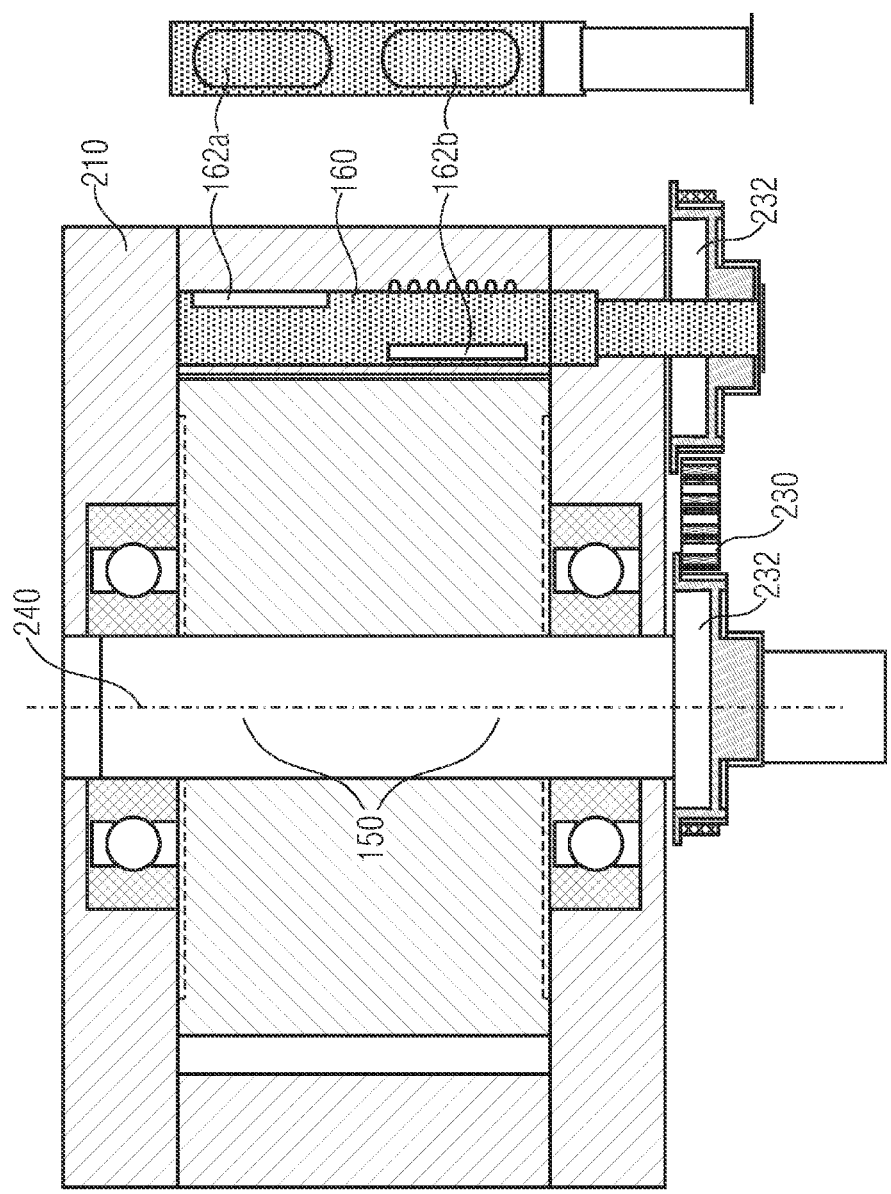

FIG. 2b shows a sectional view of the rotary engine 200 shown in FIG. 2a. The rotary engine 200 will now be described by means of FIGS. 2a and 2b in terms of its design and mode of operation.

A housing body 110, which here is configured as a cylinder tube jacket 110, forms a first rotary chamber 120—which here is configured as a cavity 120 sealed with sealing flanges 210 at the end faces—with an eccentrically arranged first rotary body 150, which here is configured as a rotary body 150 of a specifically smaller diameter, on account of the almost contacting abutment on an interior cylinder side 122 of the cylinder tube jacket 110. The cavity 120, which will sometimes also be referred to as working chamber 120 below, in turn is divided up into several working chambers A, B, C, D via the angle of rotation by means of valve flaps 170, 180 which are arranged in pairs and in a mirror-inverted manner and here are configured as valve flap blades 170, 180. Said valve flap blades 170, 180 are inserted into the rotary body 150 by means of valve flap cavities 220 such that on the one hand, they can pass a bottleneck 190 of the rotary body 150 and of the inner cylinder shape, i.e. of the boundary surface 122 of the working chamber 120 without any resistance in a positive manner with the exterior rotor contour, and that on the other hand, they are pivoted in the rotor circumference, so that the free end of a flap blade 170, 180 skim over the inner shape 122 of the cylinder tube jacket 110 by means of centrifugal force, or with support of spring force. During rotor rotation, continuously changing, but very tight partial working chambers A, B, C, D are formed, for a medium 196 contained therein which here is configured as a working gas 196 or a gas mixture 196, between the bottleneck 190 (of the rotary body 150 and the cylinder tube jacket 110) and the valve flap blades 170, 180, each of which faces the bottleneck 190. The free space between the two valve flap blades 170, 180 which face away from the bottleneck 190 is of minor importance to the function of the principle.

Advantageously as close to the bottleneck 190 as possible, there is located a further second rotary chamber 130, which here is configured as a cylindrical cavity 130 and has clearly smaller diameter sizes than the cylinder tube jacket 110. On both sides of the bottleneck 190, the cylindrical cavity 130 is connected to fine passages 192, 194, which will also be referred to as openings 192, 194 below, to form an angular arrangement to be optimized and comprising working chambers A and B. The small cavity 130 has the function of an energy absorption chamber 130 if the rotary engine 200 is a motor, and it has the function of an energy output chamber 130 if the rotary engine 200 is a kind of heat pump.

The small cavity will occasionally also be referred to as an energy absorption chamber or energy output chamber in the following.

The energy absorption chamber 130 contains a rotatable second rotary body 160 which seals well and here is configured as a bolt 160 and is equipped with specific cavities 162a, 162b which firstly split up the energy absorption chamber 130 into two equivalent halves, and separate one of the energy absorption chamber halves from the working chamber 120 and join the other half to one of the partial working chambers A, B, C, D in an alternating manner by means of synchronous rotation with the rotor body 150, depending on the application, so that the energy absorption chamber half concerned is either filled with working gas 196 or is emptied. During the phase wherein the one energy absorption chamber half is separated from the working chamber 120, energy absorption essentially takes place within the small compressed space, i.e. within cavities 162a, 162b, or energy output. Energy absorption takes place, for example, when the rotary engine 200 is used as a motor, and energy output takes place, for example, when the rotary engine 200 is used as a heat pump.

Fundamentally, the motor principle may operate in any direction of rotation. For a detailed description, counter-clockwise movement shall be assumed.

A rotor body shall also be referred to as a rotor for short in the following.

The rotor 150 is pivoted within the housing body 110 with its specific cavity 120 such that it almost touches the housing body 110 at the bottleneck 190 between the passage 192 and the passage 194. The bottleneck 190 may be configured as a lower bottleneck 190, for example. Opposite this bottleneck 190, a further bottleneck may be arranged, when an exchange of the gas filling and/or of the medium 196 may be performed for the mode of operation—depending on the kind of configuration of the rotary engine 200, which here is configured as a motor. As was already described above, the rotor 150 comprises on its circumference two opposite pairs of valve blades 170, 180 that have identical shapes and face one another and which have a pivot bearing within the rotor 150 at a cranked thickened end, respectively, and slide along the inner surface 122 of the cavity 120 with their free ends by means of centrifugal force and/or in a spring-loaded manner.

When the valve blades 170 and 180 abut on the rotor 150 and are thus turned inward and toward the valve flap cavities 220, they form a closed circular contour along with the rotor 150. The valve blades 170 and 180 have, together with the rotor body 150, the same length in the axial direction of an axis of rotation 240 of the rotor body 150. In the axial direction of the axis of rotation 240, the cavity 120 is closed off with a flange plate 210 in each case. Due to rotation of the rotor 150, subdivisions of the cavity, or working chamber, 120 into partial working chambers A, B, C, D—which either decrease or increase in size, depending on the direction of rotation—are formed in an alternating manner along with the valve blades 170, 180 that slide along the outer boundary surface 122, which here is configured as a cavity surface 122.

A partial working chamber may also be referred to as a partial chamber for short in the following.

Due to the decrease in size, a compression forms, e.g. within the partial chamber A, the partial chamber B will then serve for expansion, the partial chambers C and D will then form a common chamber if an upper bottleneck, i.e. a bottleneck opposite the bottleneck 190, does not exist. The gas contained within the partial chambers C and D is only shifted about.

It shall be noted in this context that in a further embodiment, the first bottleneck 190 may be configured as a lower bottleneck 190 arranged in an axially lower area of the rotary engine 200, and a second bottleneck opposite the first bottleneck 190 may be configured as an upper bottleneck axially arranged in an upper area of the rotary engine 200.

In applications wherein an upper bottleneck may be used, said upper bottleneck will have two outward openings located in its vicinity for ejecting combustion air (from the partial chamber C) through an, e.g., upper opening, and for drawing in fresh air (into the partial chamber B) through an, e.g., lower opening. The partial chambers C and D in this case would not be able to form a common chamber.

Figure 3A:
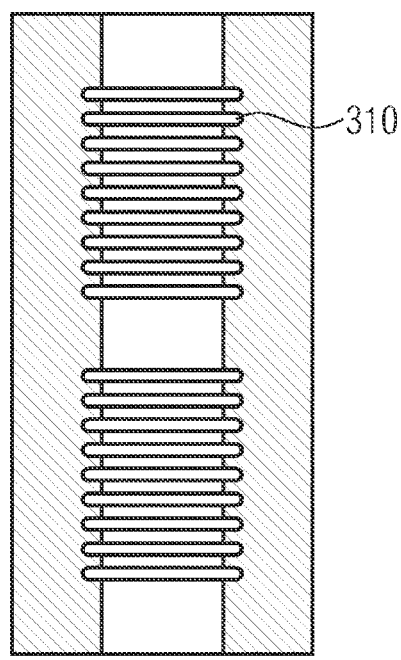
FIGS. 3a and 3b show sectional views of a rotary chamber for utilization in an embodiment of the present invention.
Figure 3B:
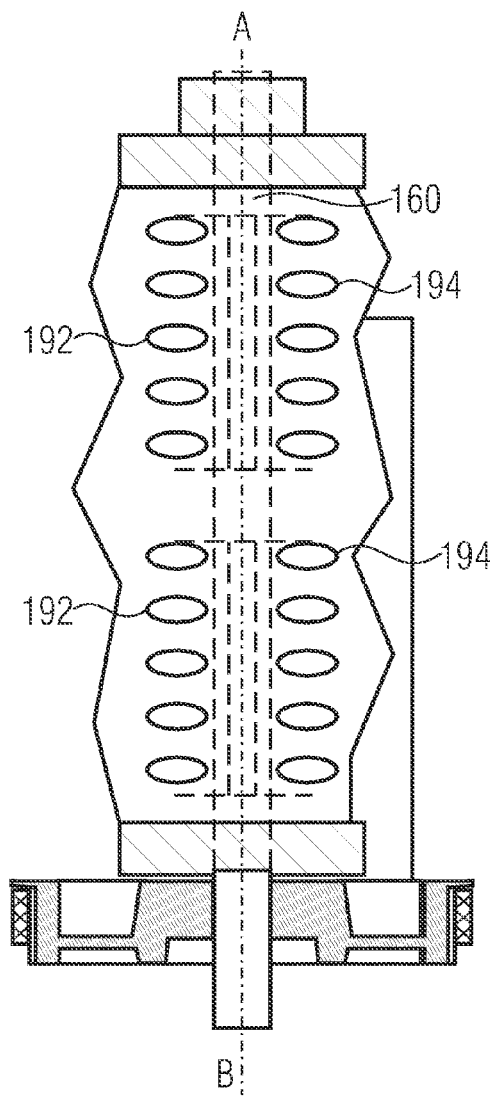

FIGS. 3a and 3b show sectional views of a rotary chamber for utilization in an embodiment of the present invention as may be configured, for example, as the energy absorption chamber 130 of the rotary engine 200. A plurality of narrow passages 192 and 194 to the underlying cylindrical chamber 130, i.e. the energy absorption chamber 130, which is filled with the rotatable bolt 160, which may also be referred to as a valve bolt 160, are located very close to the lower bottleneck 190 of the rotary engine 200. The valve bolt 160 rotates, e.g., synchronously with the rotor 150 via a toothed belt drive 230 and toothed belts 232 as are shown in FIG. 2b, and rotates in the anti-clockwise direction as well.

Depending on the application, the valve bolt 160 and the cylinder chamber, or energy absorption chamber, 130 surrounding same comprise differently shaped cavities 162a, 162b in terms of volume, which, however, are split up, over the length of the bolt 160, into e.g. two identical forms, which, however, are positioned exactly opposite each other with regard to the circumference of the bolt 160. As was already described above, this yields two energy chamber halves, and, consequently, also two compression cycles, two expansion cycles and two energy absorption cycles per revolution. In an application comprising a second bottleneck, which is opposite the first bottleneck 190, for example, there are also two exhaust gas ejection cycles and two fresh air intake cycles. To improve heat transfer during an energy absorption cycle in an energy chamber half, the energy absorption chamber 130 may have groove cavities 310, additionally shown in FIG. 3a, which additionally increase the heat conductivity of the energy absorption chamber 130. In particular, the groove cavities 310 are in conformity with the circumference only in a partial area of the bolt 160, i.e. they do not extend around the entire bolt 160.

Figure 4:
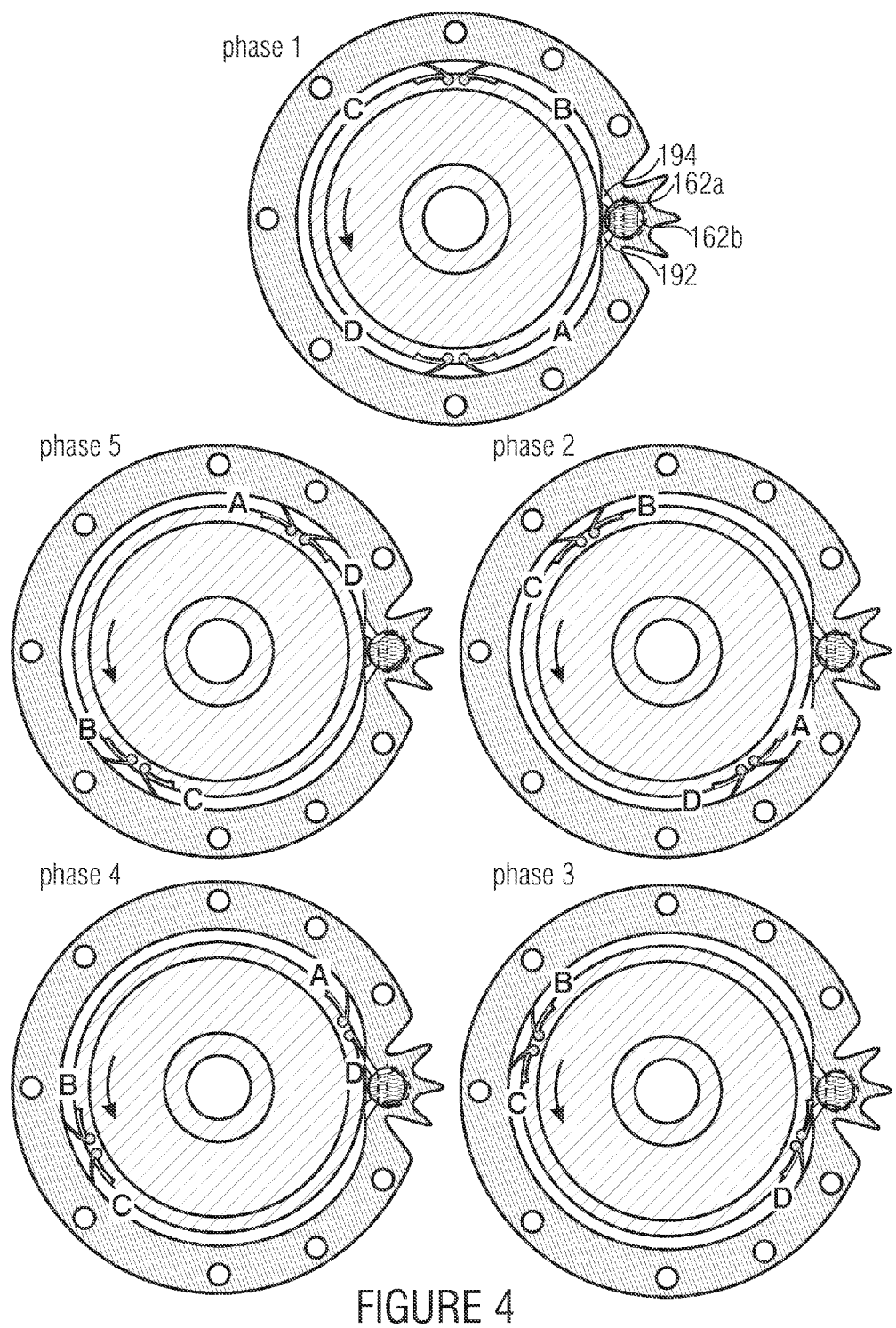
FIG. 4 shows top views of the rotary engine shown in FIG. 2a for illustrating the mode of operation of the rotary engine.

FIG. 4 shows top views of the rotary engine 200 shown in FIG. 2a in order to illustrate the mode of operation of the rotary engine 200. When the respective cavity 162a passes the passages 192, the cavity 162a is filled up, by the valve flap blade 170 of the first pair of valve flaps, with compressed air from the partial chamber A. When the valve bolt 160 is rotated further, the cavity 162a separates from the partial chamber A and forms, for about half a revolution, a closed-off chamber (which is of constant size in terms of its volume) into which energy is subsequently introduced, in which process very high pressures are generated. When the cavity 162a arrives at the passages 194, the rotor 150 with its associated pair of valve blades (the second pair in this case) 170, 180 is located, in the direction of rotation, behind the passages 194. The hot working gas flows from this cavity 162a into the working chamber B, for example, and carries out work. In other words, due to the high pressure, the high working gas flows back into the working chamber 120, where it exerts pressure on the valve blade 180 of the second pair of valve flaps, and said valve blade 180 exerts pressure on the rotor 150 and thus carries out work. By analogy, this principle also applies to cavity 162b, the air from the valve flap blade 170 of the second pair of valve flaps being forced into the cavity 162b, and the air flowing out from cavity 162b exerting pressure on the valve flap blade 180 of the second pair of valve flaps.

The rotary engine 200 described in FIGS. 2a to 4 may be configured as a hot-gas motor, or hot-gas engine, for example. In this context, energy, i.e. heat, for example, may be supplied to the working medium 196 by externally heating up the energy absorption chamber 130 by means of thermal conduction; substantially any feasible source of heat from the known fuels (stemming from fossil or regenerative sources) or concentrated solar heat, nuclear-generated heat, or process heat (waste heat) may be employed. In this case, one will invariably obtain the same working gas 196, or working medium 196, within the working chamber 120 and the energy absorption chamber 130. Just like with already known hot-gas engines, the working gas 196 may be provided with a higher basic working pressure for the purpose of increased energy density. Energy conversion of the heat introduced finally is effected in that the expansion pressure of the working gas 196 within the energy absorption chamber 130 clearly increases and carries out mechanical work during emptying into the expansion working chamber 120. Unlike reciprocating engines, the product of lever stroke, compressive force and angle of rotation is substantially more favorable since a largely constant lever stroke is available for carrying out work as early as at the beginning of the expansion. Unlike reciprocating engines and internal combustion engines, less dissipation heat is lost upon emptying of the working chamber 120, but it is retained in the cyclic process. It is therefore useful to mechanically load the engine, or rotary engine, in an optimum manner so as to achieve the best efficiency ratio from it. The amount of non-converted thermal energy at the outer housing of the rotary engine may be used for heating purposes. The principle described is referred to as a hot-gas engine because the thermal energy is introduced from outside, via a heat exchanger, to the working gas medium 196 within the energy absorption chamber 130. However, it shall be noted at this point that this principle is not further related to Stirling engines in any way, since unlike the case of Stirling engines, there is no internal heat exchanger and there are no interacting power cylinders.

Figure 5A:
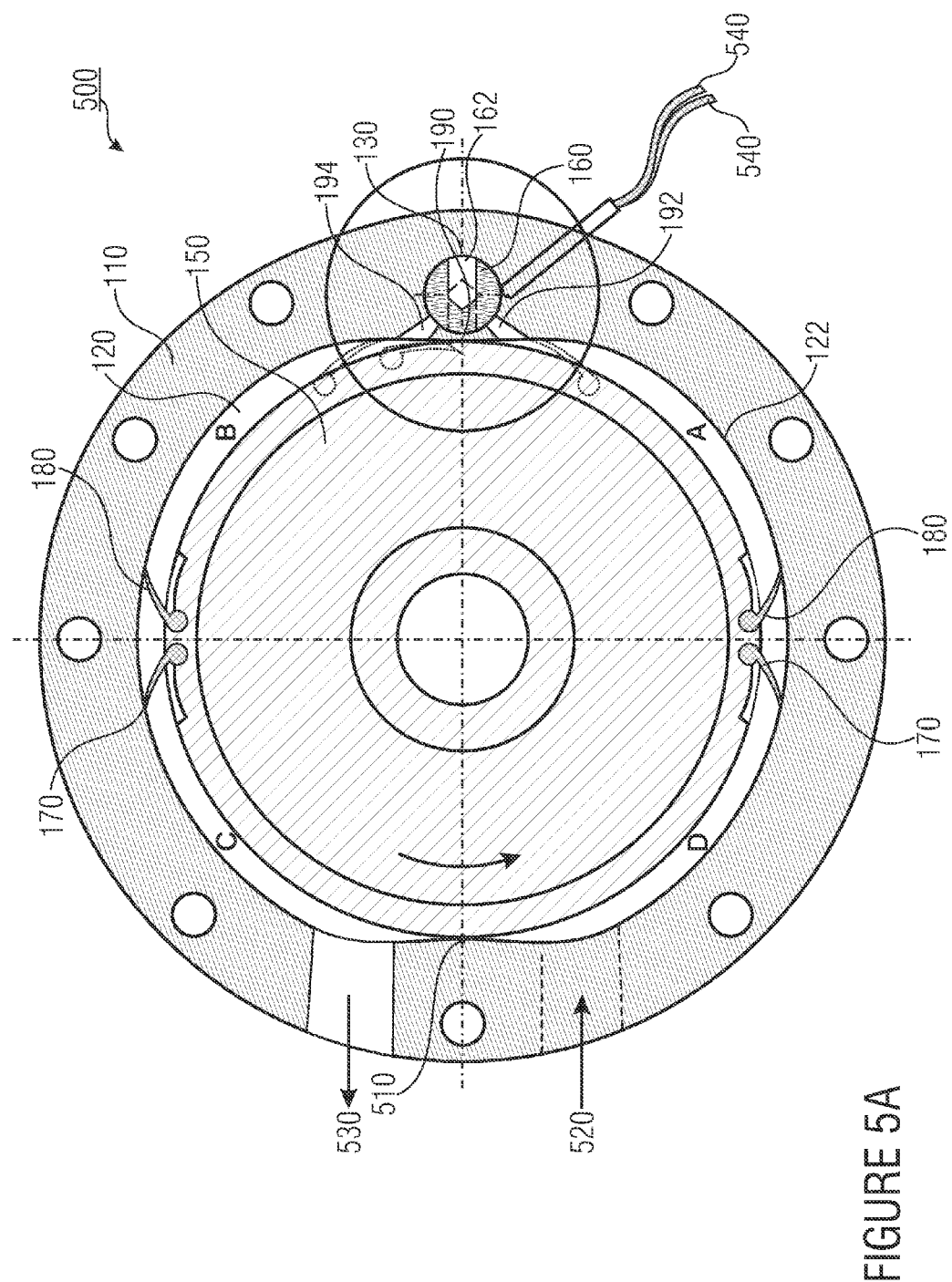
FIG. 5a shows a top view of a rotary engine in accordance with an embodiment of the present invention.

FIG. 5a shows a top view of a rotary engine 500 in accordance with an embodiment of the present invention. The rotary engine 500 is configured as an internal combustion engine in the specific embodiment described here. The rotary engine 500 has essential differences as compared to the rotary engine 200. A first difference is that the rotary engine 500 comprises a second bottleneck 510, which is positioned opposite the first bottleneck 190 and has a gas inlet opening 520 and a gas outlet opening 530. A second difference between the rotary engine 500 and the rotary engine 200 is that the rotary engine 500 comprises a fuel injection 540 configured to inject fuel into the cavities 162a, 162b of the valve bolt 160. A third essential difference between the rotary engine 500 and the rotary engine 200 is that the cavities 162a, 162b within the valve bolt 160 have a larger volume, but no groove cavities are formed in the cylinder surface of the energy absorption chamber 130 (that is, in the enclosure surface).

In other words, the rotary engine 500 may be configured as an internal combustion engine when volatile or gaseous fuels are internally burned off within the energy chamber halves. The fuels are introduced in a metered manner during the phase when the respective energy chamber half is separate from the working chamber 120. By suitably selecting the compression ratio between the working chamber half, i.e. the associated partial working chamber and the energy chamber half, ignition means such as spark plugs, for example, may be dispensed with. Knock problems as occur with known internal combustion engines, for example (for example when a fuel having too low an octane index is used) may be avoided in the rotary engine 500 due to the above-described function.

The second bottleneck 510 which is arranged, within the working chamber 220, on the opposite side of the first bottleneck 190 serves to separate the combustion air removal through the gas outlet opening 530 from the fresh-air intake through the gas inlet opening 520. The corresponding air outlet opening 530 and air inlet opening 520, which are located in the immediate vicinity of this second bottleneck 510, are introduced either in the cylinder jacket 110 or within the flanges 210. In the rotary engine 500 shown in FIG. 5a, air is drawn in via the air inlet opening 520, is compressed by means of one of the valve flaps 170 (that which is at the front in the direction of rotation), and is forced into one of the cavities 162 of the valve bolt 160 through the passage 192. During compression of the drawn-in fresh air, or gas, the temperature of the fresh air, or gas, increases due to the increase in the pressure and due to the reduction of the volume. When the valve flap 170 passes the passage 192, the compressed fresh air, or gas, is contained within the cavity 162 of the valve bolt 160. By means of the fuel supply 540, fuel is injected into this cavity 162, which fuel immediately ignites due to the high temperature of the compressed gas, whereby an extremely high pressure arises within the cavity 162 or the energy chamber half. If one of the valve flaps 180 (that valve flap of a pair of valve flaps which is the last to pass in the direction of rotation) then passes the passage 194, the cavity 162 will face the passage 194 due to the coupling of the rotor body 150 and of the valve bolt 160. The gas, which is under extreme pressure, will then immediately expand and will thus exert pressure on the valve flap blade 180, will carry out work, and thus rotate the rotor body 150. Due to the crescent shape of the valve flap blades, the valve flap blade 180 is forced against the outer boundary surface 122 of the working chamber by the pressure acting on it, and thus enhances the tightness of the associated partial working chamber. When the valve flap blade 180 passes the gas outlet opening 530, the expanded gas, or the combustion air, flows out of the rotary engine 500. The cycle then starts again.

Figure 5B:
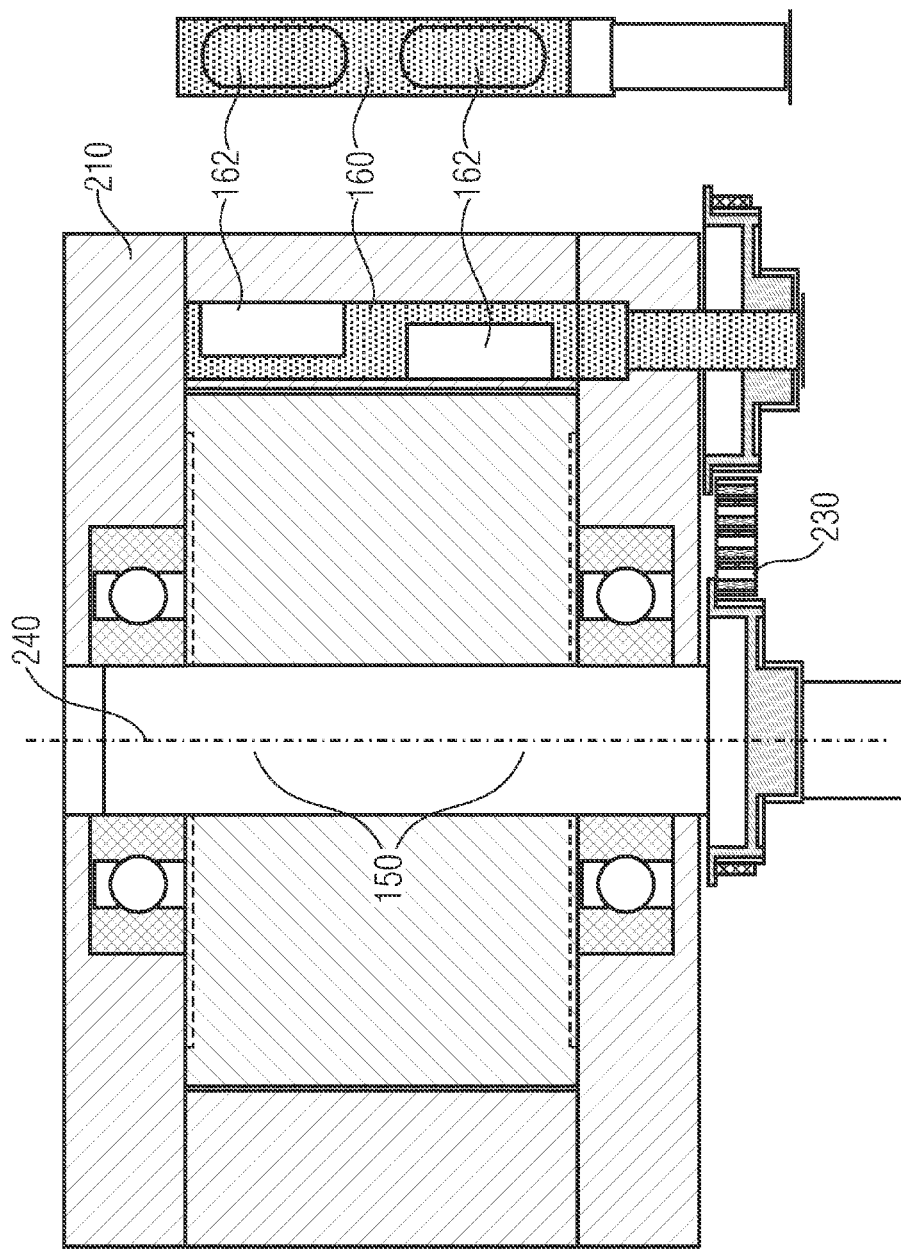

It shall once again be mentioned that with the rotary engine 500 shown in FIGS. 5a and 5b as an internal combustion engine, the cavities 162 within the valve bolt 160 are configured to be particularly deep. Accordingly, combustion takes place within a defined space, i.e. within the cavities 162.

Thus, what is absolutely decisive for the principle shown is that energy absorption takes place within a separate space that may be closed off, for example within the energy absorption chamber 130 outside the working chamber 120, and that a long period of time of almost the duration of half a revolution of the rotor 150 is available for this. These are decisive advantages as compared to the conventional types of piston engine, such as gas engines, two-stroke engines and diesel engines. With these types, only few angular degrees are available for energy development around the upper dead center. The combustion result is accordingly incomplete. This also applies, in particular, to Wankel engines, whose combustion behavior is degraded, in particular, by the fact that with high compression, the ratio of surface area and space is very unfavorable. The working gas surface is essentially formed by its contact with the metal surfaces, pistons and cylinder cross-section. It is understandable that those areas of the entrapped air that are close to metal do not provide ideal combustion conditions for the fuel due to the high thermal conductivity of the metal.

This is different with the energy absorption chamber 130 mentioned, whose room-to-surface ratio is a constant specified only by the geometry of the cavity 162 within the valve rotor bolt 160 and does not change upon rotation. On the other hand, this bolt 160 may be conveniently manufactured advantageously from a material having poor (as little as possible) thermal conductivity, such as ceramic.

Figure 6A:
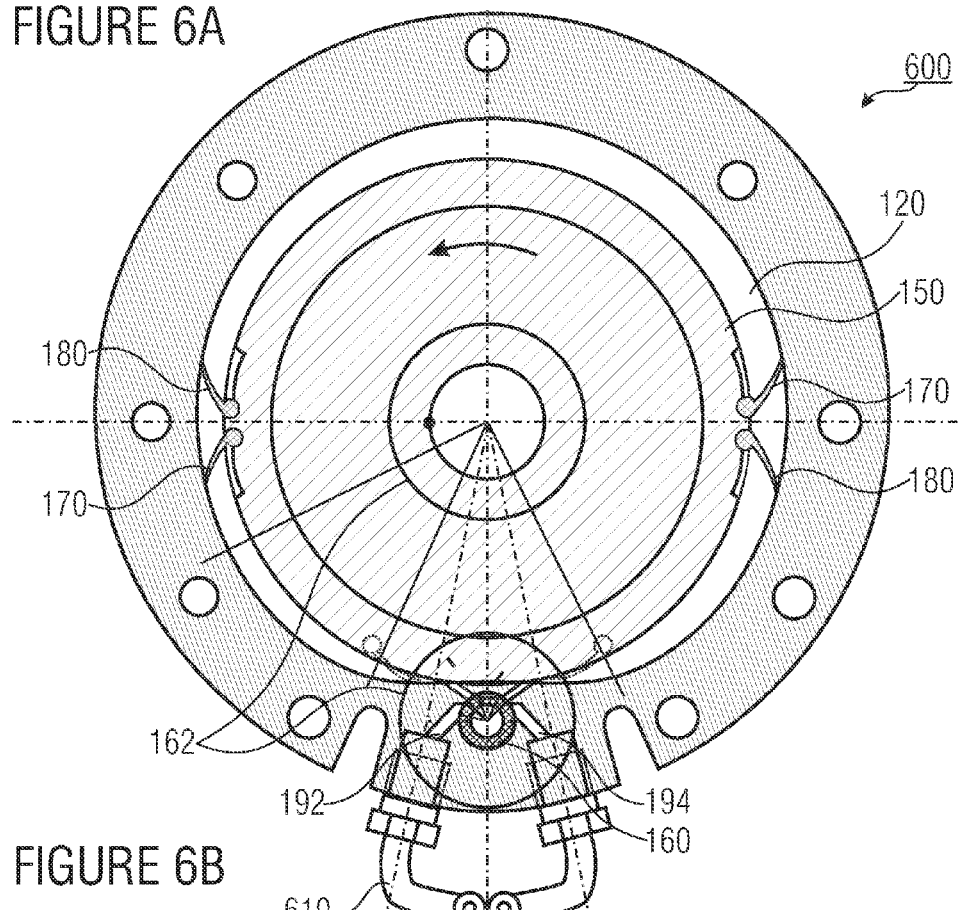
FIG. 6a shows a top view of a rotary engine in accordance with an embodiment of the present invention.
Figure 6B:
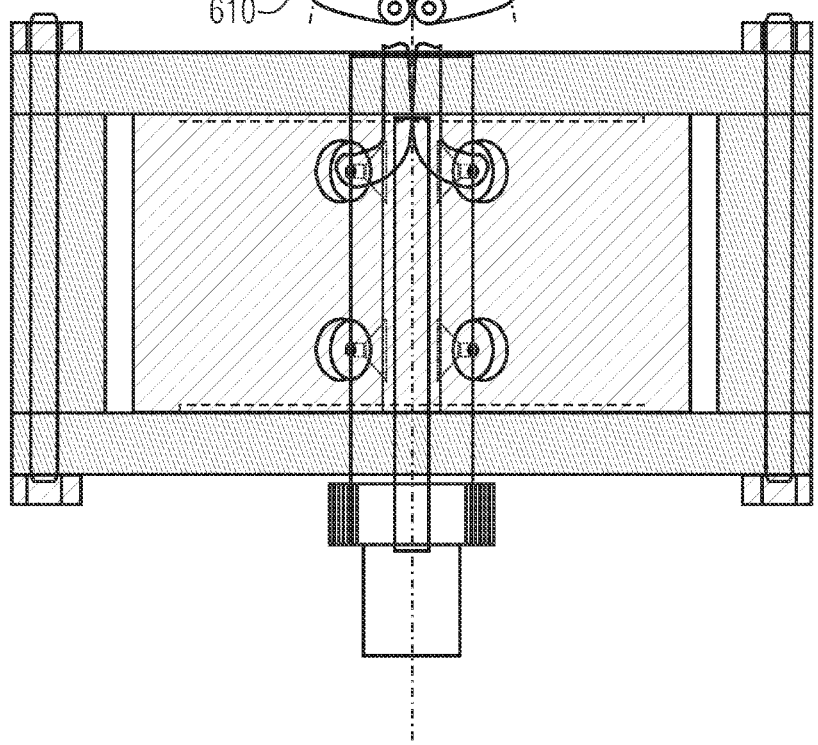

FIG. 6a shows a top view of a rotary engine 600 in accordance with an embodiment of the present invention. FIG. 6b shows a sectional view of the energy absorption chamber 130 of the rotary engine 600. In this embodiment, the rotary engine 600 is configured as a solar engine. The rotary engine 600 is characterized in that in its application as a solar engine, it has an extension of the room of the energy absorption chamber 130 into pipes 610 having very small internal cross-section. Said pipes 610, advantageously bent in a U shape, are arranged such that each U leg may be located in the focal line of inner halves of parabolic minors, which propagate in pairs on both sides of the solar engine across an adequate surface area. The space formed by the internal cross-section and the length of the U pipes 610, i.e. the extended energy absorption chamber 130, is advantageously to be sized such that a suitable compression ratio is formed along with the size of the working chamber 120 of the rotary engine, or engine, 600. On the other hand, it is to be ensured that the flow resistance within the pipes 610 does not become too high, since otherwise some of the energy will be lost during filling and emptying of the pipes 610, i.e. of the energy absorption chamber 130.

The cavities 162 in the valve bolt 160 are sized, in the rotary engine 600, such that upon rotation of the first rotary body 150, compressed gas may flow directly into the U-shaped bent pipes 610 via the cavity 162 through the passage 192. The gas which is then contained within the U-shaped bent pipes 610 is heated up, for example by solar energy, the pressure within the U-shaped bent pipes 610 increasing. The highly pressurized gas may then flow back, once the valve flap blade 180 has passed the passage 194, from the bent U pipes 610 through the cavity 162 and the passage 194 into the working chamber 120, may expand there and thus carry out work and drive the rotary body 150.

Figure 7:
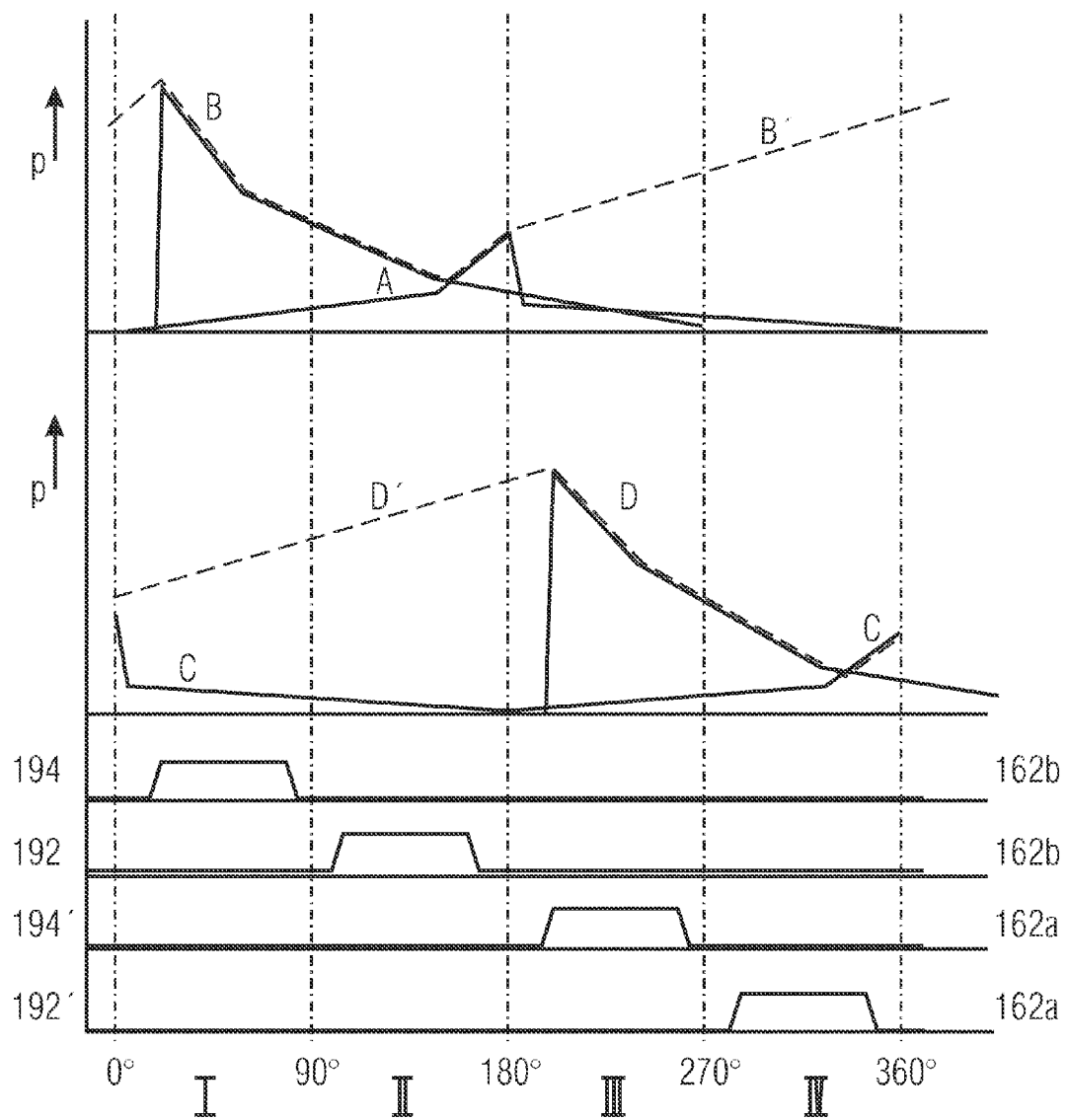
FIG. 7 shows diagrams for representing the pressure curves in a rotary engine in accordance with an embodiment of the present invention.

FIG. 7 shows three diagrams for representing the pressures present during one complete revolution of a rotary engine 700 in accordance with an embodiment of the present invention. The rotary engine 700 used for acquiring the data comprises two pairs of valve flaps for subdividing the working chamber 120 into four partial working chambers A, B, C, D. In addition, the valve bolt 160 used in the rotary engine 700 comprises two mutually independent cavities 162a, 162b, which may be axially arranged at different heights of the valve bolt 160, as is shown in FIG. 2b, for example, or which may extend on the circumference of the valve bolt 160 to the full length of the valve bolt 160 while being positioned in a mutually opposite manner. The abscissa of the diagram shown in FIG. 7 plots the positions of the two rotor bodies in degrees. The ordinate of the diagram plots the pressures in the upper two parts, and control states in the lower part. The pressure curve within the partial working chambers A, B, C, D is subdivided into the upper and central diagrams for reasons of clarity. The lower diagram provides information on whether a cavity 162a or 162b is connected to a passage 192 or 194.

In a phase I, the cavity 162b is connected to the passage 194. Compressed, highly pressurized gas contained within the cavity 162b explosively escapes into the partial working area B and carries out work there. This may be clearly recognized by the pressure in the partial working area B, which initially increases abruptly and then drops.

In a phase II, the cavity 162b is connected to the passage 192. A valve flap blade 170 then compresses gas within the partial working area A and forces it into the cavity 162b. This may be clearly recognized by an increase in pressure within the working area A.

In a phase III, the cavity 162a is connected to the passage 194. Heated, highly pressurized gas contained within the cavity 162a explosively escapes through the passage 194 and into the partial working area D. By analogy with phase I, this may be clearly recognized by the increase in pressure in the partial working area D and the subsequent pressure drop while the gas is carrying out work. In parallel with the gas carrying out work, the gas that was forced into the cavity 162b in phase II is supplied with energy, for example heat, within the cavity 162b. This results in an increase in pressure within the cavity 162b, which may be recognized by the dashed line in the topmost diagram.

In a phase IV, the cavity 162a is connected to the passage 192. Gas is compressed by a valve flap blade 170 within the partial working chamber C and is forced into the cavity 162a. In parallel with this process, the gas contained within the chamber 162b continues to be supplied with energy, for example heat, which results in a further increase in the pressure within the cavity 162b, which may be recognized by the dashed line in the topmost diagram.

Phase IV is then followed again by phase I. By analogy with the supply of energy to the gas contained within the cavity 162b during phases III and IV, the same is done during phases I and II to the gas contained within the cavity 162a. This is analogous to the topmost diagram and may be recognized by the dashed line in the central diagram.

Figure 8:
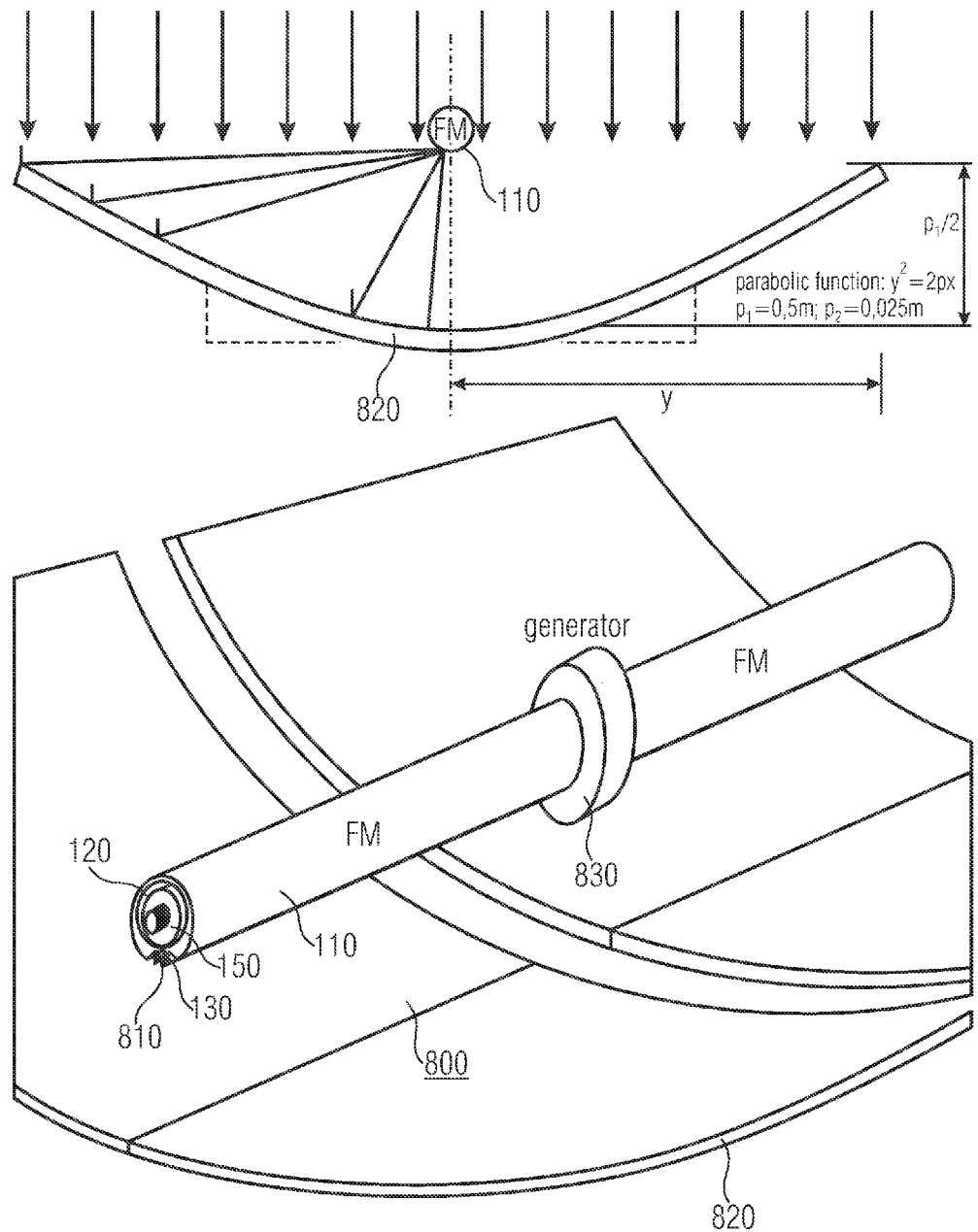
FIG. 8 shows a schematic representation of a rotary engine in accordance with an embodiment of the present invention.
Figure 9:
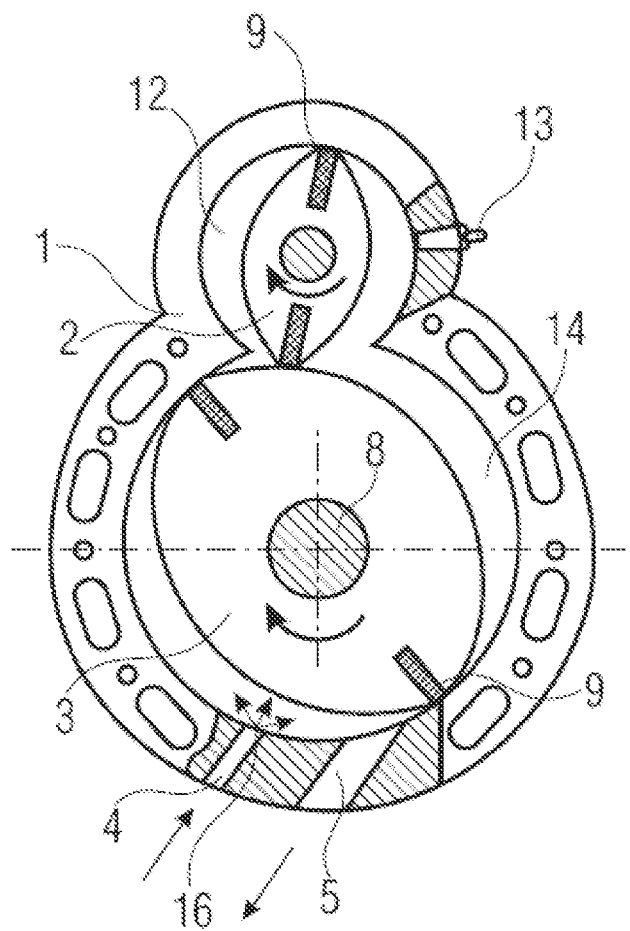
FIG. 9 shows a top view of a rotary engine in accordance with conventional technology.

FIG. 8 shows a rotary engine 800 in accordance with an embodiment of the present invention. The rotary engine 800 is configured as a solar engine. The rotary engine 800 is arranged in a focusing plane of parabolic minor halves 820 in such a manner that light incident on the parabolic minor halves 820 is focused onto the energy absorption chamber 130 of the rotary engine 800. For improved heat absorption, the housing body 110 has a serrated surface profile 810 surrounding the energy absorption chamber 130. The serrated surface profile shape 810 thus clearly increases the surface area onto which the focused light may impinge, thus improves the heat absorption from the light focused by the parabolic mirror halves 820, and therefore achieves an improved efficiency factor. A second rotary body 160 as was already described above and is contained within the energy absorption chamber 130 may have a multitude of cavities 162 which are distributed over the length of the second rotary body 160 and are not interconnected, while valve flap blades 170, 180 arranged on a first rotary body 150, which is arranged within the first rotation chamber, or rotation space, 120, continuously extend, in terms of their length, along the first rotary body 150. A generator 830 surrounding the housing body 110 of the rotary engine 800 may generate energy, for example in the form of current and/or heat, from the rotation generated within the rotary engine 800.

In accordance with further embodiments, heat generated within the rotary engine 800 may be dissipated, for example via cooling hoses on the housing body 110, for further utilization.

The mode of operation of the rotary engine 800 is identical with the mode of operation of the rotary engine 200 described in FIGS. 2a and 2b, the energy absorption within the energy absorption chamber 130 (second rotation chamber) being effected by means of light focused by the parabolic mirror halves 820. Heat formed on the surface profile shape 810 by the focused light is transferred to a medium contained within the cavities 162 and heats the medium, whereby the pressure within the cavities 162 increases, as was already described above.

Further embodiments may be configured as heat pumps. With heat pumps, the arising compression heat may be transferred to other flowing media by means of suitable heat exchangers. Similar to the working chamber 120 of the rotary engine 500 shown in FIG. 5, the working chamber 120 is provided with an opposite second bottleneck which serves to forward the working gas into external heat exchangers for energy absorption. Thus, the principle may be used as a heat pump or as a cooling system.

Further embodiments of the present invention may be configured as compressors, in which case the resulting heat may be used for heating purposes.

Further embodiments may be configured as compressed-air engines, which are supplied by a pressure reservoir. Compressed-air engines may be applied, for example, in forklift trucks operated with compressed air and having longer running times than the battery-powered ones while having identical driving power, and naturally being emission-free as compared to those operated by diesel engines or gas engines. The working chamber 120 here may be configured similarly to the working chamber 120 of the rotary engine 500 shown in FIG. 5. The energy absorption chamber 130 will operate as a valve between the working chamber 120 and a compressed-air reservoir only when work is to be carried out or when active slowing down is to take place. During the working phase, the compression may be redirected into the open air or into a further pressure reservoir that is still quite empty. The expanded air of the working chamber will then be released into the open air only, comparable to the waste gas in the case of the rotary engine 500. If compression is a hindrance, the rotary engine may be upgraded such that the intake side is closed off, so that no appreciable compression may arise that would counteract the expansion work.

In summary, it may be stated that embodiments of the present invention may be employed, for example, as hot-gas engines, internal combustion engines, solar engines, heat pumps, compressors, compressed-air engines or other rotary engines.

For applications as internal combustion engines, the cavities within the valve bolt are configured to be particularly deep. Accordingly, the combustion here takes place within a defined space, i.e. within the energy absorption chamber. For applications as hot-gas engines, solar engines, heat pumps, compressors or compressed-air engines, the cavities within the valve bolt may be designed to be very flat and will serve only to redirect the gas filling into the groove-shaped cavities that may be located around the valve bolt within the partially cylindrical chamber. The material forming this chamber needs to be a good heat conductor because the energy is introduced from outside, for example in the case of hot-gas engines, and/or is dissipated to the outside, for example in the case of heat pumps.

In summary, it may be stated that embodiments of the present invention achieve a higher level of tightness due to utilization of valve flaps for compressing a medium and due to the specific shape and arrangement of the valve flaps, and that they thus achieve a higher efficiency factor as compared to rotary engines known to date because of the largely constant lever stroke.

In addition, the basically simple design and the small number of parts promise significant cost reduction as compared to rotary engines known to date.

In addition, further embodiments may achieve cheaper manufacture and low maintenance expenditure due to utilization of cylindrical rotary bodies in mutually separate rotation chambers, without any contact of the two rotary bodies.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A rotary engine comprising:
a housing body comprising a first rotation chamber and an energy absorption chamber;
a first rotary body located within the first rotation chamber;
the housing body being configured such that a boundary surface of the first rotation chamber comprises a distance, from an opposite surface of the first rotary body, that is variable with regard to the circumference of the first rotary body;
a second rotary body located within the energy absorption chamber; and
a pair of valve flaps comprising a first valve flap and a second valve flap, each of the pair of valve flaps being rotatably arranged on the first rotary body such that upon rotation of the first rotary body, each of the pair of valve flaps are in engagement with the boundary surface of the first rotation chamber and are rotated in mutually opposite directions with regard to the first rotary body so as to form two mutually demarcated working chambers within the first rotation chamber,
the first rotation chamber being connected to the energy absorption chamber such that upon rotation of the first rotary body, a working gas compressed by one of the pair of valve flaps is transferred from one of the two mutually demarcated working chambers of the first rotary body into a cavity of the second rotary body located within the energy absorption chamber and becomes trapped between a surface of the cavity and a boundary surface of the energy absorption chamber; and
the rotary engine being configured to supply energy to the working gas trapped within the cavity of the second rotary body so as to increase a pressure of the working gas comprised within the cavity.

2. The rotary engine as claimed in claim 1, wherein the first rotary body comprises valve flap cavities for positive inclusion of corresponding ones of each of the pair of valve flaps so that upon inclusion of the valve flaps within the cavities, the valve flaps form a continuous surface with the surface of the first rotary body.

3. The rotary engine as claimed in claim 2, wherein the housing body comprises a bottleneck, so that upon rotation of the first rotary body, an area of the surface of the first rotary body comes into engagement, when passing the bottleneck, with an area of the boundary surface of the first rotation chamber, said area being located within the bottleneck; and wherein the pair of valve flaps, upon rotation of the first rotary body, are accommodated in the valve flap cavities when they pass the bottleneck.

4. The rotary engine as claimed in claim 3, wherein the energy absorption chamber is connected to the first rotation chamber by a first passage and a second passage which surrounds the bottleneck so that upon rotation of the first rotary body, the working gas may flow from the first working chamber within the first rotation chamber through the first passage into the energy absorption chamber and may flow from the energy absorption chamber through the second passage into the second working chamber within the first rotation chamber.

5. The rotary engine as claimed in claim 4, wherein the second rotary body is configured as a cylindrical rotary body and comprises the cavity for storing the working gas within the energy absorption chamber so as to absorb the working gas flowing through the first passage and to release it through the second passage upon rotation of the first rotary body.

6. The rotary engine as claimed in claim 5, wherein the second rotary body is coupled to the first rotary body, so that a rotation of the first rotary body results in a rotation, in the same direction, of the second rotary body.

7. The rotary engine as claimed in claim 6, further comprising a second pair of valve flaps comprising a third valve flap and a fourth valve flap, the second pair of valve flaps being rotatably arranged opposite the first pair of valve flaps on the first rotary body, and the second pair of valve flaps being identical or substantially identical with the first pair of valve flaps; and wherein the second rotary body comprises a second cavity for accommodating the working gas, which cavity is arranged opposite the first cavity and is arranged in an offset manner in terms of the length of the second rotary body.

8. The rotary engine as claimed in claim 7, wherein the energy absorption chamber is configured to transfer heat to the working gas comprised within a cavity of the second rotary body.

9. The rotary engine as claimed in claim 7, further comprising a second bottleneck arranged opposite the first bottleneck;

the second bottleneck being arranged between a medium outlet opening and a medium inlet opening of the housing body, so that upon rotation of the first rotary body, a portion of the working gas leaves the rotary engine through the medium outlet opening and so that further medium enters the rotary engine through the medium inlet opening; and further comprising a fuel injection to inject a fuel into the cavities of the energy absorption chamber.

10. The rotary engine as claimed in claim 7, further comprising a second bottleneck arranged opposite the first bottleneck, the second bottleneck being arranged between a third passage and a fourth passage, and the third passage being configured as an input of a heat emission device, and the fourth passage being configured as an output of the heat emission device, so that upon rotation of the first rotary body, a portion of the working enters the heat emission device through the third passage, and another portion of the working gas leaves the heat emission device through the fourth passage.

11. The rotary engine as claimed in claim 7, further comprising a U-shaped pipe;

a first end of the pipe being connected to the energy absorption chamber, so that upon rotation of the first rotary body, a portion of the working gas flows from the first working chamber of the first rotary body through the first passage via one of the cavities of the second rotary body and into the pipe; and a second end of the pipe being connected the energy absorption chamber, so that upon rotation of the first rotary body, a portion of the working gas flows from the pipe via one of the cavities of the second rotary body through the second passage and into the second working chamber within the first rotation chamber.

12. The rotary engine as claimed in claim 11, wherein the pipe is arranged within a focal line of a light-focusing device.

13. The rotary engine as claimed in claim 1, wherein the second rotary body is made of a material of low thermal conductivity.

14. The rotary engine as claimed in claim 1, wherein the distance of the first valve flap of the pair of valve flaps from the second valve flap of the pair of valve flaps is as small as possible with regard to the circumference of the first rotary body.

15. The rotary engine as claimed in claim 1, wherein the first rotary body is cylindrical and/or the second rotary body is cylindrical.

16. The rotary engine as claimed in claim 1, wherein each of the pair of valve flaps comprise a coating of wear-resistant material.

17. The rotary engine as claimed in claim 1, wherein each of the pair of valve flaps are crescent-shaped and comprise, at one of their ends, a curvature with a thickening for attachment on the first rotary body.

18. The rotary engine as claimed in claim 1, wherein the housing body is formed of two partial housing bodies, a first partial housing body comprising the first rotation chamber, and a second partial housing body comprising the energy absorption chamber, and the first partial housing body being connected to the second partial housing body in a fluid-tight manner.

19. The rotary engine as claimed in claim 1, further comprising a starter device configured to set the first rotary body in rotational motion.

20. The rotary engine as claimed in claim 1, wherein each of the pair of valve flaps comprise springs configured to rotate each of the valve flaps such that upon a standstill of the first rotary body, each of the pair of valve flaps are in engagement with the boundary surface of the first rotation chamber.

* * * * *